United States Patent [19]

Fujiwara et al.

[11] Patent Number: 4,527,174

[45] Date of Patent: Jul. 2, 1985

[54] SHEET PRESSING MECHANISM IN A PEN TYPE RECORDING DEVICE

[75] Inventors: Mitsugu Fujiwara; Yoshinori Sakaue, both of Morioka; Tomio Aso, Kitakami; Koshiro Kurokawa, Hanamaki; Hideo Obara, Ezuriko, all of Japan

[73] Assignee: Alps Electric Co., Ltd., Tokyo, Japan

[21] Appl. No.: 507,179

[22] Filed: Jun. 23, 1983

[30] Foreign Application Priority Data

Jun. 24, 1982 [JP] Japan ........................... 57-94979[U]

[51] Int. Cl.[3] ....................... G01D 15/24; B41J 11/00; B65H 17/38

[52] U.S. Cl. ............................... 346/136; 346/139 R; 400/18; 400/617; 400/636; 400/639; 226/181; 226/188; 226/191

[58] Field of Search ............... 346/136, 139 D, 139 R; 400/600.2, 18, 625, 630, 636.1, 637.1, 642, 645.4, 617, 636, 639; 226/188, 181, 191

[56] References Cited

U.S. PATENT DOCUMENTS 3,522,903 8/1970 Lloyd ............................ 226/188 X 4,439,778 3/1984 Fujisawa ........................... 346/136

*Primary Examiner*—E. A. Goldberg

*Assistant Examiner*—Gerald E. Preston

*Attorney, Agent, or Firm*—Guy W. Shoup; Gerard F. Dunne

[57] ABSTRACT

A sheet pressing mechanism in a pen type recording device including a rotatable platen and a pen adapted to move in the axial direction of the platen while contacting the platen, in which pressure rollers are brought into contact with outer peripheral surfaces of end portions of the platen, the pressure rollers being rotatably mounted on a support shaft extending in parallel with the axis of the platen, and in which the said outer peripheral surfaces of the end portions of the platen are formed of a soft material capable of being depressed by the contact pressure of the pressure rollers.

4 Claims, 3 Drawing Figures

SHEET PRESSING MECHANISM IN A PEN TYPE RECORDING DEVICE

BACKGROUND OF THE INVENTION (1) Field of the Invention

The present invention relates to a pen type recording device for forming characters, figures, graphs and the like on a sheet fed by a platen. Particularly, it is concerned with a sheet pressing mechanism capable of holding edge portions of a sheet positively on the platen.

(2) Description of the Prior Art

Various conventional recording devices such as impact printers have been proposed, but it has been impossible to draw figures, graphs and the like freely with such printers, although such printers can form characters and other symbols. In an effort to eliminate such inconvenience, a pen type recording device has recently been put to practical use, in which a recording sheet is held around a roller serving as a platen so as to be fed in the circumferential direction of the platen, and a pen opposed to the sheet can be moved in the axial direction of the platen. By controlling the feed of the sheet and the movement of the pen, it is possible to form on the sheet not only characters, but also figures and the like. For forming a figure or a graph on a recording sheet by such pen type recording device it is sometimes necessary that the recording sheet be reciprocated many times by the platen. At this time, slippage may occur between the platen and the sheet, thus causing deviation of the feed of the sheet from the motion of the platen, which may result in a distorted figure being formed on the sheet. Therefore, it is necessary that the sheet be held positively with respect to the platen.

SUMMARY OF THE INVENTION

The present invention has been made to solve the above-mentioned problems, and it is the object thereof to provide a sheet pressing mechanism in a pen type recording device capable of holding a recording sheet positively with respect to a platen.

The present invention is characterized in that pressure rollers for pressing a recording paper are brought into pressure contact with peripheral surfaces at end portions of a platen, and in that the peripheral surfaces of end portions of the platen are formed of a soft material such as a soft rubber capable of being indented by the contact pressure of the pressure rollers.

An embodiment of the present invention will be described below with reference to the accompanying drawings.

DESCRIPTION OF A PREFERRED EMBODIMENT

Figure 1:
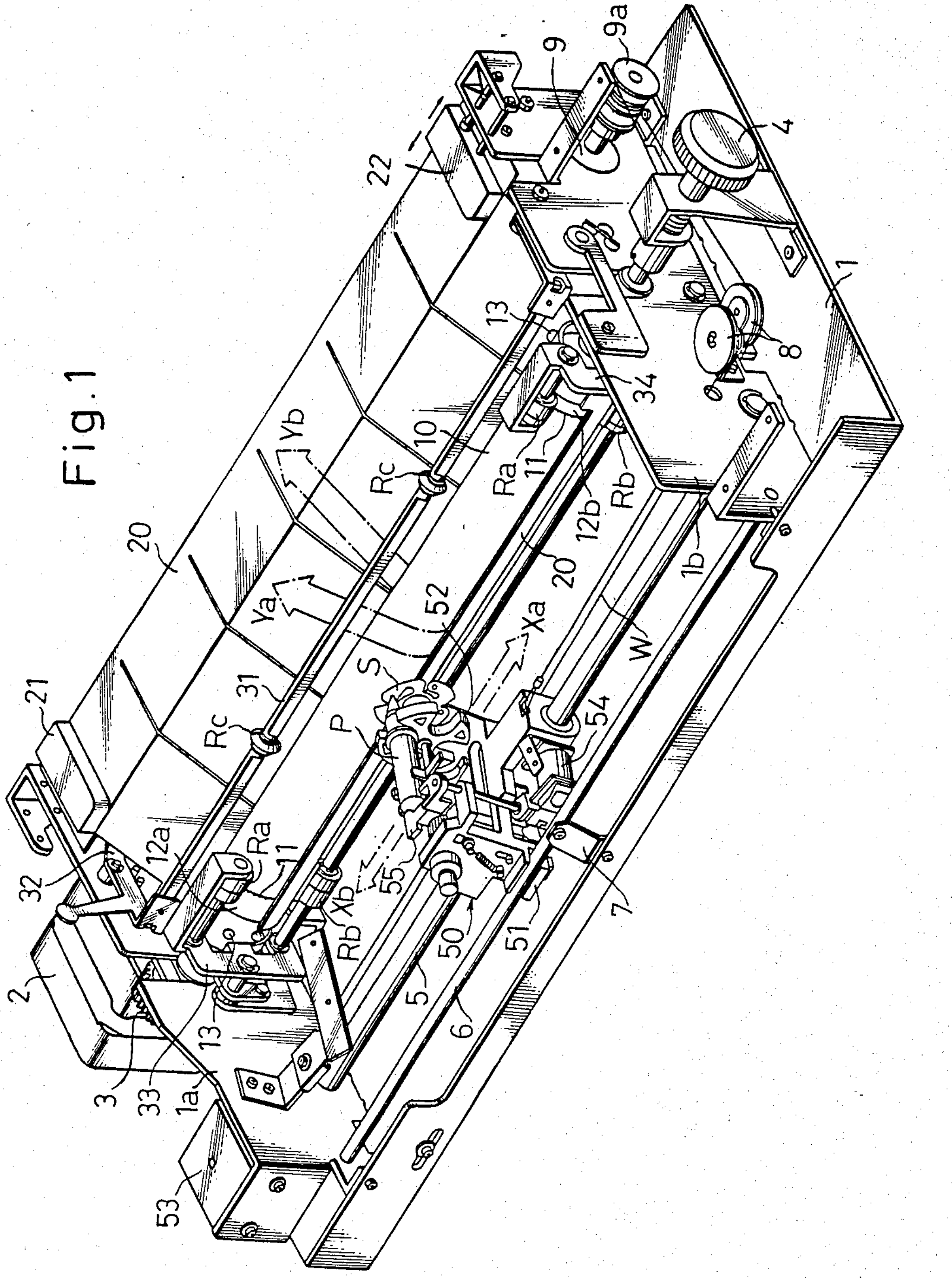
FIG. 1 is a perspective view of the entirety of a pen type recording device.

Referring to FIG. 1, there is shown an perspective view of a pen type recording device, in which a multicolor switching type pen P is moved in the direction of the arrows Xa and Xb, while a recording sheet (not shown) is fed in directions of arrows Ya and Yb by means of a platen 10. By controlling the movement of the pen and the sheet in these X and Y directions, characters, figures and the like can be drawn on the sheet. The platen 10 can be rotated both forwardly and backwardly by a gear 3 by virtue of a driving force of a stepping motor 2 mounted on a base 1. It can also be rotated manually by a handle 4. The recording sheet is inserted in the Ya direction from over a guide plate 20, on which are mounted a fixed positioning member 21 and a movable positioning member 22. In a position between both positioning members 21 and 22 the recording sheet is fed below the platen 10 while being guided at both side ends thereof by the positioning members 21 and 22. The movable positioning member 22 can be moved in the directions shown by the arrows to adjust to various sheet sizes such as A4 and B5 sizes. The sheet fed below the platen 10 is guided by the fore end of the guide plate 20 and reaches the recording side of the platen 10, where it is held between pressure rollers Ra, Rb each provided on respective right and left sides of the platen 10. The upper end of the sheet further passes below sheet pressing rollers Rc which are positioned above the platen 10, and extends in the direction of the arrow Ya. The rollers Rc are for preventing an end portion in the Ya direction of the sheet under recording from being turned upwardly toward the pen P.

When loading or positioning the sheet, it is necessary to disengage the pressure rollers Ra and Rb from the sheet 10, and this operation is effected by lifting up the platen pressing shaft 31. More specifically, left and right support members 33 and 34 for the pressure rollers Ra and Rb are interlocked with the pivotable lever 32 which supports the sheet pressing shaft 31 and are adapted to move away from the platen 10 upon a lifting motion of a pivotable lever 32.

The pen P is carried on a pen carriage 50. The pen carriage 50 is adapted to move in the Xa-Xb direction on a main shaft 5 extending between the side plates **1*a* and 1*b* which are mounted on the base 1. The pen carriage 50 is formed at its rear portion with a guide groove 51 for sliding on an auxiliary shaft 6 extending between the side plates 1*a* and 1*b*. The angle of the pen carriage 50 relative to the platen 10 depends upon the relative position of the main shaft 5 and auxiliary shaft 6. In the figure, the pen carriage 50** is inclined so that the tip end of the pen P faces downward. This is for improving the flow of ink within the pen P.

Because the supporting span at both ends of the auxiliary shaft 6 is long, a central portion of the auxiliary shaft 6 is fixed onto the base 1 through a strut 7, whereby the main shaft 5 and the auxiliary shaft 6 are held in an exact parallelism, and the angle of the pen P relative to the platen 10 is kept constant while the pen carriage 50 moves in the Xa–Xb direction.

The movement of the pen carriage 50 in the Xa–Xb direction is effected by being pulled with a wire W. The wire W is engaged with pulleys 8 mounted outside each of the side plates **1*a* and 1*b* and then wound around a pulley 9*a* of a stepping motor 9 which is mounted below the guide plate 20. By forward and reverse rotation of the stepping motor 9, the pen carriage 50** is pulled by the wire W in the Xa–Xb direction.

Four pens P can be held by a holder 52 on the pen carriage 50 (only one pen P is shown in FIG. 1). The holder 52 is rotatable on the pen carriage 50 and this rotation is effected by a solenoid 53 mounted outside the side plate 1*a*. More specifically, the main shaft 5 rotates at a predetermined angle by virtue of attraction of the solenoid 53 and this rotating force of the main shaft 5, which has a non-circular section, is transmitted to a ratchet mechanism within the pen carriage 50 whereby the holder 52 is rotated thereby allowing a desired pen P to reach a recording position (the uppermost position). The pen P is held in a retracted position relative to the platen 10 by being pushed with a return leaf spring S. In this state, when a hammer 55 is driven by a solenoid 54 mounted on the pen carriage 50, the tip end of the pen P in the recording position is pushed by the hammer 55 and thereby comes into pressure contact with the platen 10.

More particularly, one of the four pens P, having a desired color, is shifted to the uppermost position and then the pen carriage 50 is moved in the Xa–Xb direction by the stepping motor 9, while the recording sheet is moved in the Ya–Yb direction by the stepping motor 2 while being held between the platen 10 and the pressure rollers Ra, Rb. And by pushing the pen P with the hammer 55 to bring its tip end into pressure contact with the sheet, characters, figures or the like can be drawn on the sheet according to motions in the X and Y directions.

Figure 2:
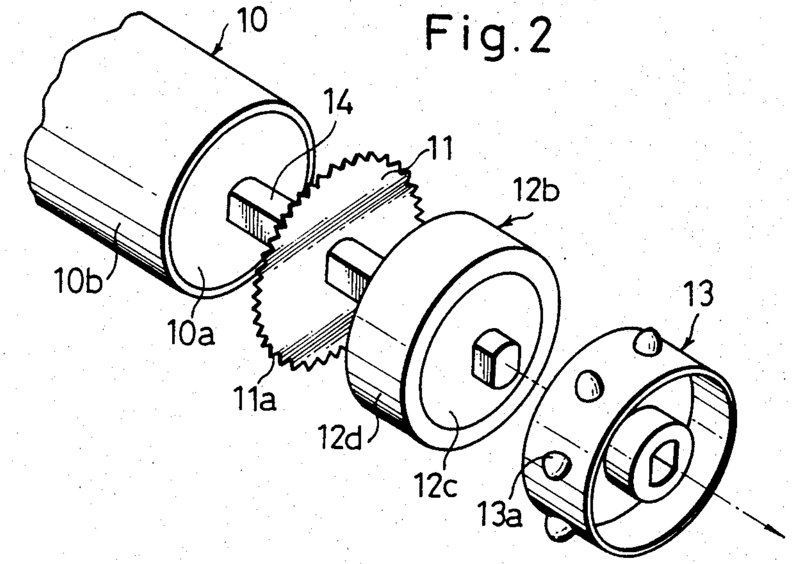
FIG. 2 is an exploded perspective view showing a structure of an end portion of a platen.

Referring now to FIG. 2, there is shown an exploded perspective view illustrating a structure of an end portion of the platen 10, in which the platen 10 is fixedly mounted on a main shaft 14, with the gear 3 being attached to an end portion of the main shaft 14. The platen 10 is composed of a core member 10*a* made of aluminum or other material and a outer rubber layer 10*b* which covers the outer peripheral surface of the core member 10*a*. The outer rubber layer 10*b* is formed of a material having a high hardness. To both side ends of the platen 10 are attached toothed plates 11, and short platens 12*a* (left) and 12*b* (right) are attached in positions outside the toothed plates 11. And outside the short platens 12*a* and 12*b* are mounted sprockets 13. The toothed plates 11, short platens 12*a*, 12*b* and sprockets 13 are fitted on the main shaft 14 so as to be rotatable integrally with the shaft 14.

The toothed plate 11 is obtained by blanking a thin metallic plate, with plural teeth 11*a* being formed on the circumference thereof, the teeth 11*a* projecting from the outer peripheral surface of the platen 10.

The short platens 12*a* and 12*b* are each comprised of a core member 12*c* and a surface member 12*d* which covers the outer peripheral surface of the core member. The core member 12*c* is made of aluminum or other material like the core member 10*a* of the platen 10, and the surface member 12*d* is formed of a material softer than the outer rubber layer 10*b*, e.g. a soft synthetic rubber or a foamed material. It is necessary for the surface member 12*d* to have a hardness to the extent that it can be depressed upon pressure contact with the pressure rollers Ra and Rb. The sprocket 13 is provided with circumferentially disposed pawls 13*a*.

Figure 3:
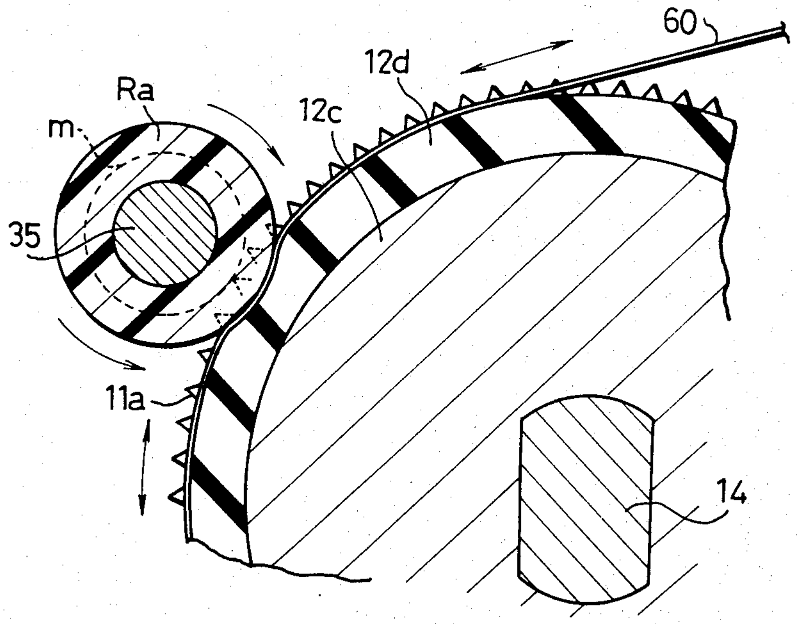
FIG. 3 is a sectional view showing in what manner a recording sheet is held by a sheet pressing mechanism embodying the invention.

The pressure rollers Ra and Rb are each mounted rotatably on a support shaft 35 which is parallel to the main shaft 14, and those rollers are held in pressure contact with the short platens 12*a*, 12*b* and the teeth 11*a* by virtue of a spring pressure. In the portion of each of the pressure rollers Ra and Rb opposed to the teeth 11*a* is formed a groove "m" (the inside diameter of the groove "m" is shown in dotted line in FIG. 3). The pressure rollers Ra and Rb are formed of a material harder than that of the surface member 12*d* of the short platens 12*a* and 12*b*, e.g. a resin or a metal.

The following description is now provided about the function and effect of the present invention having the above-described construction.

Various kinds of sheets are employable as a recording sheet 60 to be used in this pen type recording device. In case the sheet 60 is provided at both side ends thereof with small feed holes, the sheet 60 is fed in the Ya–Yb direction while being held between the platen and the pressure rollers Ra, Rb. At this time, the small feed holes of the sheet 60 are engaged with the pawls 13*a* of the sprocket 13, so that the sheet 60 is moved in complete synchronism with the rotation of the platen 10.

In case the recording sheet 60 is a so-called letter paper not having such small feed holes at both side ends thereof, it is held at both side ends between the short platens 12*a*, 12*b*, toothed plates 11 and the pressure rollers Ra, Rb in pressure contact therewith. At this time, the teeth 11*a* of the toothed plate 11 bite in the sheet 60, whereby the sheet is held firmly with respect to the platen 10. Besides, the short platens 12*a* and 12*b* under pressure contact with the pressure rollers Ra and Rb are depressed or indented at their peripheral surfaces (the portion of the surface member 12*d*), so that by these indented portions the side ends of the sheet 60 are also held strongly. Because, the contact area between the sheet 60 and the short platens 12*a*, 12*b* is enlarged by such inward deformation. Moreover, a substantial projection of the teeth 11*a* becomes longer as a result of such deformation, so that the holding force of the teeth 11*a* for the sheet 60 becomes stronger. Thus, the side ends of the sheet 60 are kept completely integral with the platen by such deformation of the short platens 12*a*, 12*b* and by engagement thereof with the teeth 11*a*.

When the sheet 60 is integral with the platen 10 and is fed in complete synchronism with the rotation of the platen 10, slippage between the sheet 60 and the platen is prevented during the recording operation, so that lines described with the pen P are free from distortion and the accuracy of recorded contents is improved.

The side ends of the sheet 60 can be held strongly by the aforementioned inwarded depression of the peripheral surfaces of the short platens 12*a* and 12*b*. Therefore, even without provision of the toothed plates 11, the sheet 60 can be fed exactly without causing slippage by being held between the short platens 12*a*, 12*b* and the pressure rollers Ra, Rb.

In the illustrated embodiment, the pressure rollers Ra and Rb contact the short platens 12*a* and 12*b*, but also contact peripheral surface portions of the platen 10 partially at their fore end portions. Therefore, if the both end portions of the platen 10 with which the pressure rollers Ra and Rb come into contact are formed of the same material as that of the surface member 12*d*, the area of inward deformation is further expanded and the holding force for the sheet 60 is enhanced. Furthermore, if the hardness of the platen rubber 10 is made high while the diameter of the short platens 12*a* and 12*b* is made larger than that of the platen 10, the depth deformation of the short platens 12*a* and 12*b* becomes larger even when the pressure rollers Ra and Rb also contact the outer rubber layer 10*b*, so that the holding force for the sheet 60 is enhanced.

According to the present invention, as described hereinabove, since the peripheral surfaces of the end portions of the platen are formed of a soft material capable of being depressed by the contact pressure of the pressure rollers, the contact area is enlarged thus permitting a recording sheet to be held strongly at both side ends thereof. Consequently, a perfect synchronism is attained between the rotation of the platen and the feed of the sheet, with no slippage occurring therebetween, so that in the case of forming lines with the pen while reciprocating the sheet in the Ya–Yb direction, an exact recording without causing distortion of the lines can be performed.

What is claimed is:

1. A sheet holding mechanism in a pen type recording device including a rotatable platen and a pen adapted to move in the axial direction of the platen while contacting paper held against the platen for forming images on a portion of the paper held against a central portion of the platen, said sheet holding mechanism including pressure rollers brought into pressure contact with outer peripheral surfaces of the end portions of said platen, said pressure rollers being rotatably mounted on a support shaft extending in parallel with the axis of said platen, said outer peripheral surfaces of the end portions of said platen being formed of a material softer than the material forming the central portion of the platen and capable of being indented by the contact pressure of said pressure rollers.

2. A sheet holding mechanism according to claim 1, said outer peripheral surfaces of the end portion of the platen having a diameter greater than the central portion thereof.

3. A sheet holding mechanism according to claim 2, further including a respective wheel having teeth adapted to bite within the undersurface of said paper and fitted between said central portion of the platen and the outer peripheral surfaces thereof, whereby said pressure rollers increase the length of the teeth biting into said paper as they indent the outer peripheral portions of the platen.

4. A sheet holding mechanism according to claim 1, further including a respective wheel having teeth adapted to bite within the undersurface of said paper and fitted between said central portion of the platen and the outer peripheral surfaces thereof, whereby said pressure rollers increase the length of the teeth biting into said paper as they indent the outer peripheral portions of the platen.

* * * * *